(12) United States Patent
Li et al.

(10) Patent No.: US 9,838,598 B2
(45) Date of Patent: Dec. 5, 2017

(54) IMAGE IDENTIFICATION SYSTEM AND IMAGE STORAGE CONTROL METHOD

(71) Applicant: GRG Banking Equipment Co., Ltd., Guangzhou, Guangdong (CN)

(72) Inventors: Ming Li, Guangzhou (CN); Mengtao Liu, Guangzhou (CN)

(73) Assignee: GRG Banking Equipment Co., Ltd., Guangzhou, Guangdong (CN)

(*) Notice: Subject to any disclaimer, the term of this patent is extended or adjusted under 35 U.S.C. 154(b) by 138 days.

(21) Appl. No.: 14/416,626

(22) PCT Filed: Apr. 9, 2013

(86) PCT No.: PCT/CN2013/073932
§ 371 (c)(1),
(2) Date: Jan. 22, 2015

(87) PCT Pub. No.: WO2014/023109
PCT Pub. Date: Feb. 13, 2014

(65) Prior Publication Data
US 2015/0271397 A1    Sep. 24, 2015

(30) Foreign Application Priority Data
Aug. 9, 2012  (CN) .......................... 2012 1 0282874

(51) Int. Cl.
*G06K 9/00* (2006.01)
*H04N 5/232* (2006.01)
(Continued)

(52) U.S. Cl.
CPC ....... *H04N 5/23229* (2013.01); *G06Q 20/042* (2013.01); *G06T 1/0007* (2013.01);
(Continued)

(58) Field of Classification Search
USPC .................. 235/379; 370/381, 412; 382/128; 600/365; 707/999.004, 999.202, 758, 781
See application file for complete search history.

(56) References Cited

U.S. PATENT DOCUMENTS

| 4,464,787 A | 8/1984 | Fish et al. |
| 6,088,777 A * | 7/2000 | Sorber .................. G06F 9/5016 370/381 |

(Continued)

FOREIGN PATENT DOCUMENTS

| CN | 1834919 A | 9/2006 |
| CN | 101082999 A | 12/2007 |

(Continued)

OTHER PUBLICATIONS

Venkataramani, K., "ESc101: (Linear, Circular, Doubly) Linked Lists, Stacks, Queues, Trees," Apr. 2012.*

(Continued)

*Primary Examiner* — Xuemei Chen
(74) *Attorney, Agent, or Firm* — Wolf, Greenfield & Sacks, P.C.

(57) ABSTRACT

An image identification system for conducting image identification of a valuable file in an automatic teller machine and a corresponding image storage control method are provided. The system comprises: an image sensor; an image memory; an image identification module; an image storage area controller; and a main control unit, wherein the image storage area controller comprises a storage area index link table which is divided into N nodes, N being a natural number greater than 1, each node corresponding to each of the image storage areas divided by the image storage area controller in a one to one relationship, and each node storing the storage locations of a previous image and a next image which are linked with the node, and being provided with an (Continued)

acquired image write pointer, an identified image read pointer, an unidentifiable image head pointer, and an unidentifiable image tail pointer.

14 Claims, 5 Drawing Sheets

(51) Int. Cl.
*G07D 7/20* (2016.01)
*G06Q 20/04* (2012.01)
*G06T 1/00* (2006.01)
*G06T 7/00* (2017.01)

(52) U.S. Cl.
CPC ............ *G06T 7/0002* (2013.01); *G07D 7/20* (2013.01); *G06T 2207/10004* (2013.01); *G06T 2207/30176* (2013.01)

(56) References Cited

U.S. PATENT DOCUMENTS

| | | | |
|---|---|---|---|
| 6,427,195 B1 | 7/2002 | McGowen et al. | |
| 6,499,028 B1* | 12/2002 | Brock | G06F 11/3409 707/999.004 |
| 6,785,674 B2* | 8/2004 | Vu | G06F 17/30961 |
| 7,111,289 B2* | 9/2006 | Koob | G06F 12/023 711/170 |
| 7,113,516 B1* | 9/2006 | Shefi | G06F 13/385 370/412 |
| 7,310,719 B2* | 12/2007 | Von Bergen | G06F 9/5016 707/999.202 |
| 7,770,029 B2* | 8/2010 | Venkatesan | G06F 12/0802 707/781 |
| 7,899,233 B2* | 3/2011 | Kagehiro | G06Q 20/1085 235/379 |
| 8,762,624 B2* | 6/2014 | Binz | G06F 12/0246 600/365 |
| 9,262,554 B1* | 2/2016 | Bailey | G06F 17/30985 |
| 2008/0123913 A1* | 5/2008 | Virag | G06F 17/3028 382/128 |
| 2010/0146213 A1* | 6/2010 | Yao | G06F 12/0802 711/136 |
| 2012/0265776 A1* | 10/2012 | Wang | G06F 17/30902 707/758 |

FOREIGN PATENT DOCUMENTS

| | | |
|---|---|---|
| CN | 101290689 A | 10/2008 |
| CN | 101452588 A | 6/2009 |
| CN | 101833815 A | 9/2010 |
| CN | 102142168 A | 8/2011 |
| CN | 102253898 A | 11/2011 |
| CN | 102521278 A | 6/2012 |
| CN | 102831694 A | 12/2012 |
| EP | 2124204 A2 | 11/2009 |
| GB | 2 284 293 A | 5/1995 |
| JP | 2012-18534 A | 1/2012 |

OTHER PUBLICATIONS

Written Opinion of the International Searching Authority, dated Jul. 11, 2013, from corresponding International Application No. PCT/CN2013/073932.

International Search Report from corresponding International Application PCT/CN2013/073932.

Extended European Search Report from corresponding European Application No. 13 82 8011 dated Jul. 16, 2015.

\* cited by examiner

| 1 | image storage region |
|---|---|
| 2 | image storage region |
| 3 | image storage region |
| 4 | image storage region |
| 5 | image storage region |
| ...... | ...... |
| 100 | image storage region |

| 1 | image to be identified 1 |
|---|---|
| 2 | image to be identified 2 |
| 3 | image storage region |
| 4 | image storage region |
| 5 | image storage region |
| ...... | ...... |
| 100 | image storage region |

| 1 | rejected banknote image 1 |
|---|---|
| 2 | image to be identified 2 |
| 3 | image storage region |
| 4 | image storage region |
| 5 | image storage region |
| ...... | ...... |
| 100 | image storage region |

| 1 | rejected banknote image 1 |
| 2 | image storage region |
| 3 | image storage region |
| 4 | image storage region |
| 5 | rejected banknote image 2 |
| ...... | ...... |
| 100 | image storage region |

| 1 | rejected banknote image 1 |
| 2 | image storage region |
| 3 | rejected banknote image 2 |
| 4 | image storage region |
| 5 | rejected banknote image 3 |
| 6 | image storage region |
| 7 | image storage region |
| ...... | ...... |
| 79 | image storage region |
| ...... | ...... |
| 100 | rejected banknote image 95 |

IMAGE IDENTIFICATION SYSTEM AND IMAGE STORAGE CONTROL METHOD

This application is the US national phase of International Application No. PCT/CN2013/073932 filed on Apr. 9, 2013, which claims the priority to Chinese patent application No. 201210282874.1, titled "IMAGE IDENTIFICATION SYSTEM AND IMAGE STORAGE CONTROL METHOD" and filed with the State Intellectual Property Office on Aug. 9, 2012, which applications are hereby incorporated by reference to the maximum extent allowable by law.

FIELD OF THE INVENTION

The invention relates to an image identification system, particularly to an image identification system for identifying an image of a valuable document in an ATM (Automated Teller Machine) and an image storage control method thereof.

BACKGROUND OF THE INVENTION

An identification apparatus is needed to be installed on a machine for processing financial bills in order to identify characteristics of the processed financial bills. For example, a banknote identification device is provided on a financial device, such as, an automated teller machine (ATM), a sorter, a counting machine, which is mainly used for identifying a currency, a denomination, an orientation and a legitimacy of a banknote. Since some anti-counterfeit marks are added to banknotes in the process of designing and printing the banknotes, the banknote identification apparatus is generally provided with some sensors for detecting and acquiring related anti-counterfeit marks. For example, a surface image or a transmission image of banknotes is acquired by irritating the banknotes by light with different wavelengths, and then the banknotes are identified according to the acquired information of relevant images.

Figure 1:
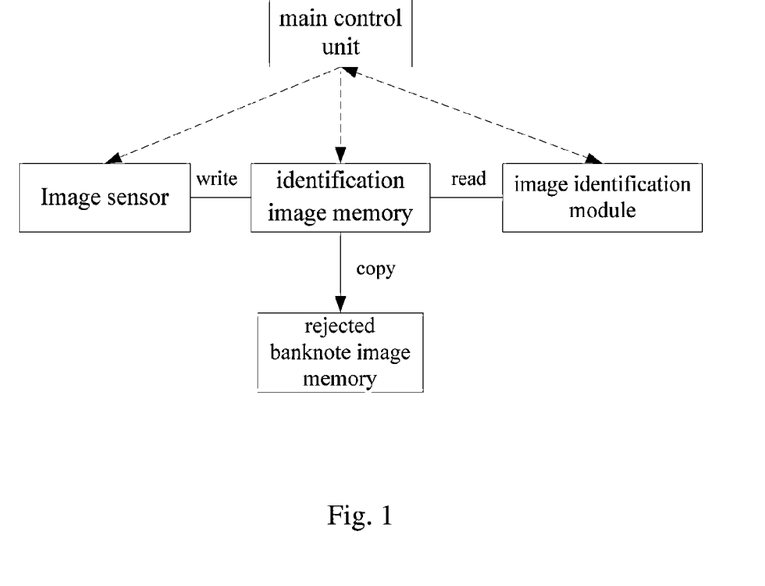
FIG. 1 is a schematic diagram of modules composed of an image identification system in the prior art.

At present, the image information acquired by the above-mentioned optical image sensors is stored in a predetermined identification image memory, and then an image identification module identifies a currency, a denomination, an orientation and a legitimacy of a stored image of each valuable document. Since the identification module may fail to identify the acquired image information, in order to analyze and study the reasons for identification failures, the image information failing to be identified (hereinafter referred to as "rejected banknote image") is stored. According to the stored the rejected banknote image, a developer can conveniently find some faults of the sensor hardware or the identification module or find algorithm defects, so as to provide a basis for further improvement. An existing method for storing a rejected banknote image is shown in FIG. 1, and the image information failing to be identified is copied from an identification image memory to a rejected banknote image memory which is set in advance.

When a single CPU is used, the process of copying the rejected banknote images can not be operated at the same time as the process of identifying images in algorithm, and these processes must be performed in sequence. Therefore, when the identification module fails to identify an image, a lot of time is spent on copying the image to the rejected banknote image memory. Thus, the identification module has to stop the identification on other images, which greatly influences the identification speed of the identification module. In order to meet the requirement of ATM for high speed processing on valuable documents, how to spend the processing time of CPU mostly on identifying the acquired image information and reduce the time wasted on non-identification calculation as much as possible, are the technical problems which those skilled in the art have been trying to solve.

SUMMARY OF THE INVENTION

An object of the invention is to provide an image identification system which dispenses with a copy of a rejected banknote image. The system may greatly reduce the processing time of a CPU occupied by a non-identification calculation task, and effectively improve the identifying speed of the image identification system.

The image identification system includes:

an image sensor adapted to acquire an image of an identification object;

an image memory adapted to divide an image storage space into N storage regions according to a maximum data volume of the acquired image, wherein N is a natural number greater than 1, and each of the storage regions is configured to store one acquired image;

an image identification module adapted to identify an image stored in the image memory;

an image storage region controller adapted to control the storage region for the acquired image and a storage region for an image failing to be identified;

a main control unit adapted to control and coordinate data calculation and transmission between the above-mentioned components.

Specifically, the image storage region controller includes a storage region index linked list which is divided into N nodes, where N is a natural number greater than 1. The nodes are in a one-to-one correspondence with the storage regions, each node is adapted to store storage locations of a previous image and a next image linked to the node; and the storage region index linked list is provided with three node pointers: an acquired image writing pointer for pointing to a writing node corresponding to a storage region for writing the acquired image; an identification image reading pointer for pointing to a reading node corresponding to a storage region for storing an image to be identified; a rejected banknote image tail pointer for pointing to a rejected banknote node corresponding to a storage region for a latest rejected banknote image; and when there is no the rejected banknote image, the rejected banknote image tail pointer points to an invalidity location.

Preferably, the storage region index linked list includes N nodes, and each node includes at least two units. The first unit stores an address of an image storage region for the previous image linked to the node. The second unit stores an address of an image storage region for storing the next image linked to the node.

Further, the storage region index linked list is divided into two linked lists: an image storage linked list and a rejected banknote image linked list. The image storage linked list includes a node in the storage region index linked list corresponding to a storage region in which the acquired image is to be written, and the rejected banknote image linked list includes a node in the storage region index linked list corresponding to a storage region occupied by the rejected banknote image.

Preferably, the image storage region controller is further provided with a rejected banknote image head pointer for pointing to a node corresponding to a storage region for a first rejected banknote image.

Further, when a new rejected banknote image is generated, an identification image reading pointer points to a tail of the rejected banknote linked list, and a node to which the rejected banknote image head pointer points is inserted to a node to which the identification image reading pointer points, so as to add the new rejected banknote image to an identification linked list. The identification image reading pointer is directed to a next node, the rejected banknote image head pointer is directed to a node corresponding to a storage region for storing a next rejected banknote image, and the storage locations of a previous image and a next image linked to each of the next node and the node corresponding to a storage region of a next rejected banknote image and stored into the node are modified.

Another object of the invention is to provide an image storage control method, which includes the following steps:

Step 1, acquiring an image of an identification object by an image sensor;

Step 2, writing, by a main control unit, the acquired image into a corresponding image storage region according to a writing node to which an acquired image writing pointer of an image storage region controller points;

Step 3, directing the acquired image writing pointer to a node corresponding to a storage location of a next image that is stored in the writing node; performing step 1 or step 2 under the control of the main control unit;

Step 4, identifying, by an image identification module, an image in an image storage region corresponding to a reading node to which an identification image reading pointer points, and if the image is identified, performing step 5; otherwise, performing step 6;

Step 5, determining whether the image in an image storage region corresponding to a reading node to which an identification image reading pointer points is not a last acquired image; and directing the identification image reading pointer to a node corresponding to a storage location of a next image which is recorded in the reading node, and returning to step 4;

Step 6, moving a rejected banknote image tail pointer and modifying addresses of locations for storing relevant nodes, where the rejected banknote image tail pointer is directed to the reading node; a storage location of a next image which is stored in a node corresponding to a storage location of a previous image stored into the reading node is modified to be a storage location of a next image which is stored in the reading node, and a storage location of a previous image which is stored in a node corresponding to a storage location of a next image stored in the reading node is modified to be a storage location of a previous image which is stored in the reading node;

Step 7, modifying a storage location of a previous image of a node to which the rejected banknote image tail pointer points to be a node corresponding to a storage region for storing a previous rejected banknote image;

Step 8, determining whether the image in an image storage region corresponding to a node to which the rejected banknote image tail pointer points is not the last acquired image; and directing the identification image reading pointer to a node corresponding to a storage location of a next image recorded in the reading node, and returning to the step 4.

Preferably, the image storage control method further includes: step 0, initializing a storage region index linked list to implement a one-to-one correspondence the nodes with the storage regions, when the image identification system is initialized; writing into the current node an address of an image storage region corresponding to a previous node adjacent to a current node and an address of an image storage region corresponding to a next node adjacent to the current node; directing both the acquired image writing pointer and the identification image reading pointer to the first node, and directing the rejected banknote image tail pointer to an invalidity location.

In order to achieve the normal identification function of the image identification system, the image storage region controller is further provided with a rejected banknote image head pointer for pointing to a node corresponding to a storage region for a first rejected banknote image. When the number of the rejected banknote images reaches the maximum permissible value, in the case that a new rejected banknote image is generated, a node to which the identification image reading pointer points is need to be added to the tail of the rejected banknote linked list, a node to which the rejected banknote image head pointer points is inserted to a location to which the identification image reading pointer points, and the new rejected banknote image is added to an identification linked list. The identification image reading pointer is directed to a next node, the rejected banknote image head pointer is directed to a node corresponding to a storage region of a next rejected banknote image, and the storage locations of a previous image and a next image linked with the node and stored into the two nodes are modified.

Comparing with the prior art, the image identification system has the following advantages.

Since the image storage region controller adopts a storage region index linked list, it is no longer required for copying images failing to be identified to other storage regions, such that the CPU time occupied by copying images is spent on process of identifying images, and the processing speed of the image identification system on valuable documents may be greatly improved.

DETAILED DESCRIPTION OF THE INVENTION

In order to further illustrate the invention, a preferred exemplary embodiment of the invention is described in conjunction with accompanying drawings in the following.

Figure 2:
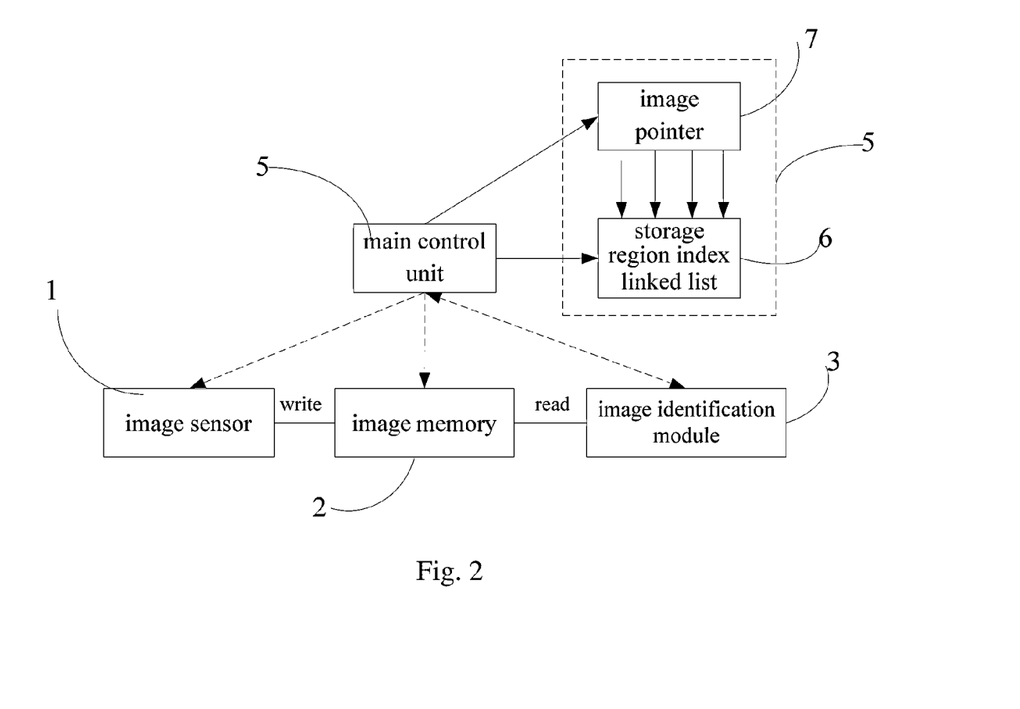
FIG. 2 is a schematic diagram of modules composed of an image identification system according to the invention.
Figure 3:
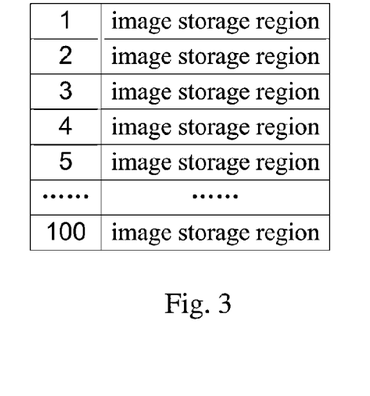
FIG. 3 is a schematic diagram of organization form of image storage regions when the image identification system according to the invention is initialized.

Referring to FIG. 2 and FIG. 3, an image identification system includes: an image sensor 1 adapted to acquire an image of an identification object; an image memory 2 adapted to divide an image storage space into N image storage regions according to a maximum data volume of the acquired image, where N is a natural number greater than 1, each of the storage regions is used for storing one acquired image, the N is set to 100 generally in the embodiment; an image identification module 3 adapted to identify images stored in the image memory; an image storage region controller 4 adapted to control storage regions of the acquired images and storage regions for images failing to be identified; a main controller 5 adapted to control and coordinate a data calculation and a transmission between the above-mentioned components.

The image storage region controller 4 includes a storage region index linked list 6 including N nodes, where N is a natural number greater than 1. The nodes are in a one-to-one correspondence with the image storage regions, and each node stores storage locations of a previous image and a next image linked with the node. The storage region linked list 6 is provided three node pointers 7: an acquired image writing pointer 71 for pointing to a writing node corresponding to a storage region for writing the acquired image; an identification image reading pointer 72 for pointing to a reading node corresponding to a storage region for storing an image to be identified; a rejected banknote image tail pointer 73 for pointing to a rejected banknote node corresponding to a storage region for a latest rejected banknote image, where when there are no the rejected banknote image, the rejected banknote image tail pointer points to an invalidity location. In the embodiment, the storage region index linked list 6 also includes 100 nodes, and each node includes two units. The first unit stores an address of an image storage region storing a previous image which is linked to the node, and the second unit stores an address of an image storage region storing a next image which is linked to the node. In the embodiment, the storage region index linked list 6 includes a two-dimensional array. Since an array has successive storage addresses, the storage region linked list 6 may meet the requirements as long as each node of the storage region linked list 6 has two units. In addition, since the value of N is 100, only one byte of the first unit or the second unit may meet the requirement for storing the addresses of the image storage regions. When the storage region index linked list 6 adopts non-successive addresses, each node needs to include three units: one unit adapted to store a corresponding relationship of the node and an image storage region, one unit adapted to store an address of an image storage region storing a previous image which is linked to the node, and the latest one adapted to store an address of an image storage region storing a next image which is linked to the node.

Figure 8:
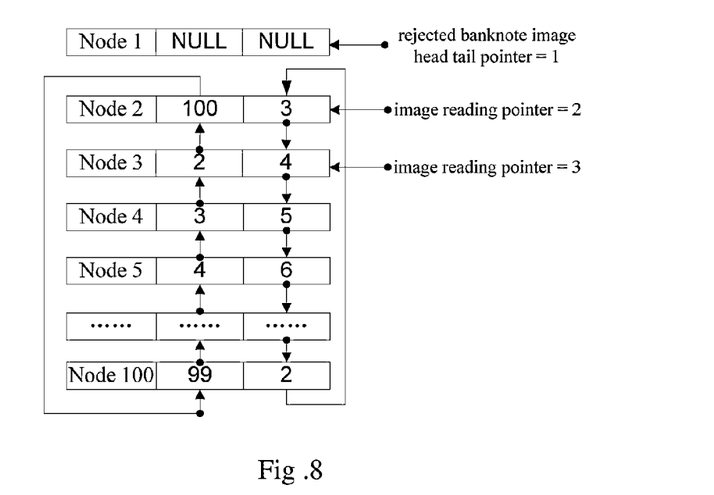
FIG. 8 is a schematic diagram of organization form of a storage region index linked list when the image identification system according to the invention fails to identify a first image.

Referring to FIG. 8, when there are any rejected banknote images, the storage region index linked list is divided to two two-dimensional arrays, which are respectively used as an image storage linked list 61 and a rejected banknote image linked list 62. The image storage linked list 61 includes nodes of the storage region index linked list corresponding to the storage regions for writing acquired images. The rejected banknote image linked list 62 includes nodes of the storage region index linked list corresponding to the storage regions occupied by the rejected banknote images.

With more and more acquired images, there are more and more rejected banknote images. To identify the valuable documents by the image identification system continuously, a small part of storage regions are required to be reversed for the identified images. Thus, when the storage number of rejected banknote images reaches a set maximum value, storage regions occupied by early rejected banknote images will be gradually released to store new acquired images. Therefore, the image storage region controller 4 is further provided with a rejected banknote image head pointer 74, the rejected banknote image head pointer 74 is adapted to point to a node corresponding to a storage region for a first rejected banknote image. The rejected banknote image head pointer 74 is gradually close to the rejected banknote image tail pointer as storage regions for rejected banknote images are released.

Accordingly, an image storage control method includes the following steps.

S1, acquiring an image of an identification object by an image sensor 1;

S2, writing, by the main control unit 5, the acquired images into corresponding image storage regions according to a writing node to which the acquired image writing pointer 71 of the image storage region controller 4 points;

S3, directing the acquired image writing pointer 71 to a node corresponding to a storage location of a next image stored in the writing node; and going to the S1 or the S2 under the control of the main controller 5;

S4, identifying, by the image identification module 3, an image in an image storage region corresponding to a reading node to which the identification image reading pointer 72 points, if the image is identified, going to S5, otherwise, going to S6;

S5, determining whether the image in an image storage region corresponding to a reading node to which an identification image reading pointer 72 points is a last acquired image; if the image is the last acquired image, ending the process; else, directing the identification image reading pointer 72 to a node corresponding to a storage location of a next image stored in the reading node, and going to the S4;

S6, moving the rejected banknote image tail pointer 73 and modifying an location address stored in a relevant node, where the rejected banknote image tail pointer 73 points to the reading node; and a storage location of a next image which is stored in a node corresponding to a storage location of a previous image stored in the reading node is modified to be a storage location of a next image which is stored in this reading node, a storage location of a previous image which is stored in a node corresponding to a storage location of a next image stored in the reading node is modified to be a storage location of a previous image which is stored in this reading node;

S7, modifying a storage location of a previous image stored in a node to which the rejected banknote image tail pointer 73 points to be a node corresponding to a storage region saving a previous rejected banknote image;

S8, determining whether the image in an image storage region corresponding to a node to which the rejected banknote image tail pointer 73 points is the last acquired image; if the image is the last acquired image, ending the process; else, directing the identification reading pointer 72 to a node corresponding to a storage location of a next image stored in the reading node, and going to the S4.

In order to achieve the normal identification function of the image identification system, the image storage region controller 4 is further provided with a rejected banknote image head pointer 74 for pointing to a node corresponding to a storage region of a first rejected banknote image. When the number of the rejected banknote images reaches a maximum permissible value, in the case that a new rejected banknote image is generated, a node to which the identification image reading pointer 72 points need to be added to the tail of the rejected banknote linked list, a node to which the rejected banknote image head pointer 74 points is inserted to a location to which the identification image reading pointer 72 points, and the new rejected banknote image is added to the identification linked list. The identification image reading pointer 72 is directed to a next node, the rejected banknote image head pointer 74 is directed to a node corresponding to a storage region of a next rejected banknote image, and the storage locations of previous images and next images linked with the nodes and stored into the two nodes are modified.

In the following, an operation principle and process of the image identification system is further described in conjunction with FIG. 3 to FIG. 13.

Figure 4:
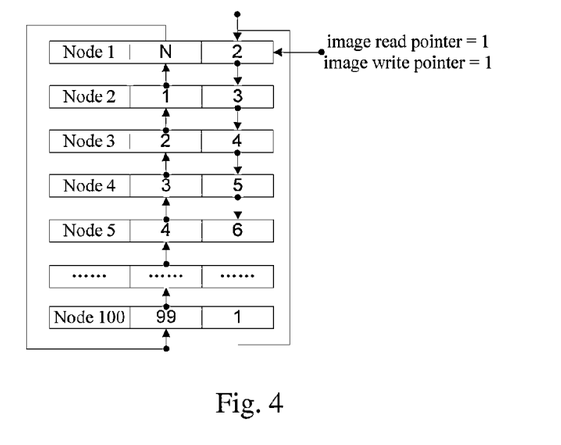
FIG. 4 is a schematic diagram of organization form of a storage region index linked list when the image identification system according to the invention is initialized.

Referring to FIG. 3, when the image identification system is initialized, an image storage apace is divided into N image storage regions according to a maximum data volume of the acquired image under the control of the main control unit 5, where N is a natural number greater than 1, N is 100 generally in the embodiment. Each storage region stores one acquired image. The storage region index linked list 5 is initialized as N nodes, where N is 100 in the embodiment. The nodes are in a one-to-one correspondence with the image storage regions, each node stores storage locations of a previous image and a next image linked to the node. For Example, storage locations of images 100 and 2 are stored in a first node, storage locations of 1th and 3th images are stored in a second node, storage locations of 2th and 4th images are stored in a third node, storage locations of 3th and 5th images are stored in a forth node, . . . , storage locations of 99th and 1th images are stored in a 100th node, so as to connect all the nodes in series, as shown in FIG. 4. At this time, both the acquired image writing pointer 71 and the identification image reading pointer 72 are directed to the first node, and both the rejected banknote image head pointer and the rejected banknote image tail pointer are directed to an invalidity location.

When the image identification system begins to acquire and identify the valuable documents (here refers to banknotes), the following steps are performed.

S1, acquiring, by an image sensor 1, an image of an identification object.

S2, writing, by the main control unit 5, the acquired image into a first image storage corresponding to a first node, since the writing node to which the acquired image writing pointer 71 of the image storage region controller 4 points is a first node.

S3, directing the acquired image writing pointer 72 to a second node corresponding to a storage location of a next image stored in the first node; and then going to the step S1 of acquiring images or going to the step S4 of identifying images under the control of the main control unit 5.

S4, identifying, by the image identification module 3, an image in the first image storage region corresponding to the first node to which the identification image reading pointer 72 points, if the image is identified, going to S5, otherwise; going to S6.

S5, directing the identification image reading pointer 72 to the second node corresponding to a storage region of a next image stored in the first node, and going to S4. It is to be noted that in the step S4 the acquiring image writing pointer 71 can not be exceeded, that is, a location to which the identification image reading pointer 72 points is always less than or equal to a location to which the acquired image writing pointer 71 points. If the location to which the identification image reading pointer 72 points is larger than the location to which the acquired image writing pointer 71 points, an invalidity image may be read, leading to an identification error.

S6, directing the rejected banknote image tail pointer 73 to the first node; and modifying a storage location 1 of a next image which is stored in a 100th node corresponding to a storage location of a previous image stored in the first node to be a storage location 2 of a next image stored in the first node, modifying a storage location of a previous image which is stored in the second node corresponding to a storage location of a previous image stored in the first node to be a storage location 100 of a previous image stored in the first node.

S7, modifying a storage location of a previous image of a node to which the rejected banknote image tail pointer 73 points to be a node corresponding to a storage region storing a previous rejected banknote image. In the case of the first rejected banknote image, storage locations of a previous image and a next image stored in the first node are both null. In the case of rejected banknote images except the first one, a storage location of a previous image stored in a node to which the rejected banknote image tail pointer 73 points will be modified to be a node corresponding to a storage region storing a previous rejected banknote image. In this way, the first node is released from the identification linked list and the first node is connected in series to the rejected banknote linked list. In this process, a rejected banknote image is stored, rather than the copy of the image, thereby saving the time of copying the rejected banknote image.

S8, directing the identification image reading pointer 72 to a node corresponding to a storage location of a next image stored in the reading node, and going to the S4.

As the image is continuously acquired and identified, the above-mentioned acquired image writing pointer 71, the identification image reading pointer 72, the rejected banknote image tail pointer 73 and rejected banknote image head pointer 4 are directed according to the above-mentioned rules, and storage locations of a previous image and a next image stored in relevant nodes are modified accordingly to form a series organization of nodes in the corresponding image storage linked list and rejected banknote image linked list.

Figure 5:
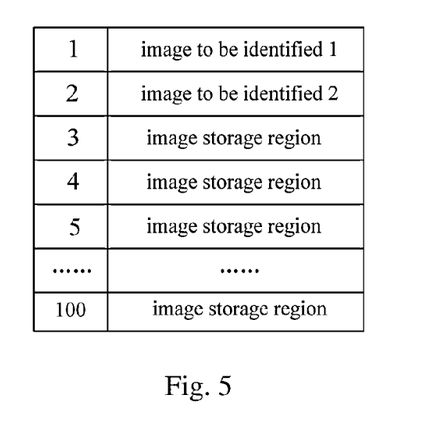
FIG. 5 is a schematic diagram of organization form of image storage regions when the image identification system according to the invention acquires a third image.
Figure 6:
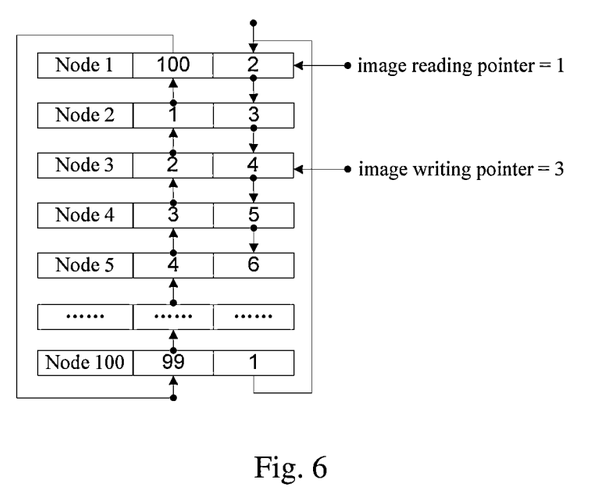
FIG. 6 is a schematic diagram of organization form of a storage region index linked list when the image identification system according to the invention identifies a first image.
Figure 7:
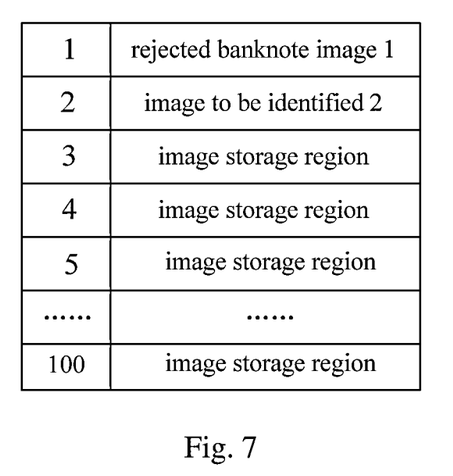
FIG. 7 is a schematic diagram of organization form of image storage regions when the image identification system according to the invention fails to identify a first image.
Figure 9:
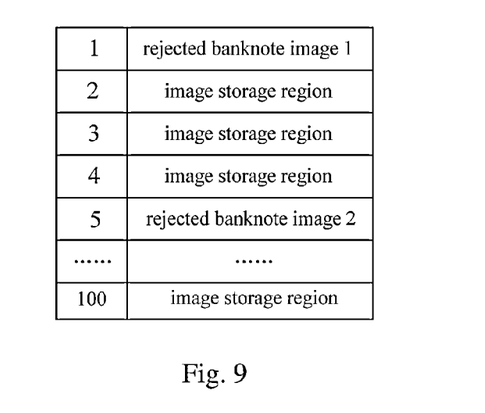
FIG. 9 is a schematic diagram of organization form of image storage regions when the image identification system according to the invention fails to identify a second image.
Figure 10:
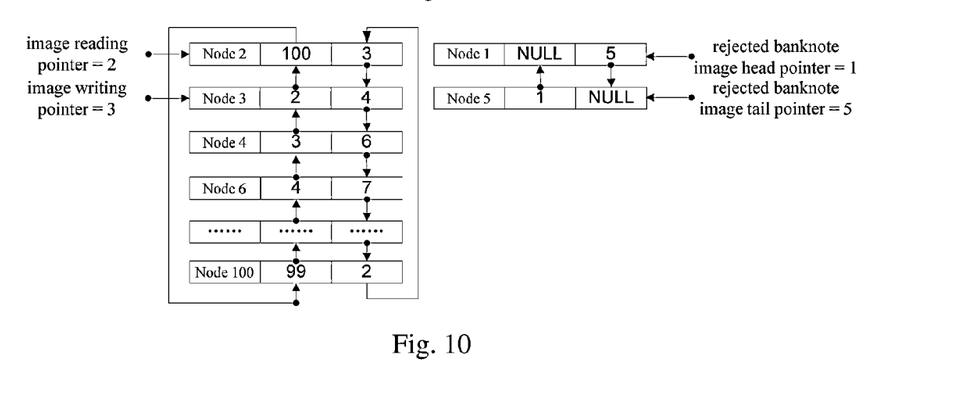
FIG. 10 is a schematic diagram of organization form of a storage region index linked list when the image identification system according to the invention fails to identify a second image.

The change rules of image storage regions and storage region index linked list are further shown with the continuous acquerment and identification of the image in conjunction with FIG. 5 to FIG. 13 in the following. After two images have been acquired, when a third image is acquired and a first image is identified, the content in the image storage region is shown in FIG. 5 and an organization form of the storage region index linked list is shown in FIG. 6. If the first image fails to be identified by the identification module, the content in the image storage region is shown in FIG. 7, and an organization form of the storage region index linked list is shown in FIG. 8. With continuously writing the acquired images and identifying the identification image by the identification module, when an identification image corresponding to a fifth node fails to be identified, the content in the image storage region is shown in FIG. 9, and an organization form of the storage region index linked list is shown in FIG. 10.

Figure 11:
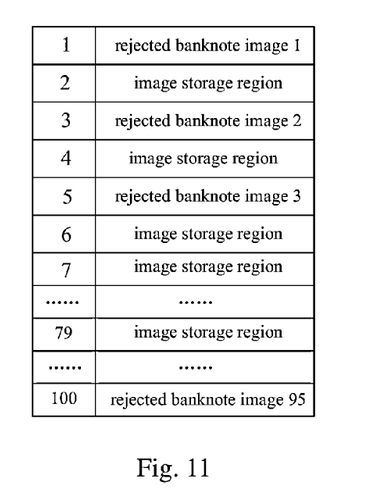
FIG. 11 is a schematic diagram of organization form of image storage regions when the number of images failing to be identified by the image identification system according to the invention reaches a maximum value.
Figure 12:
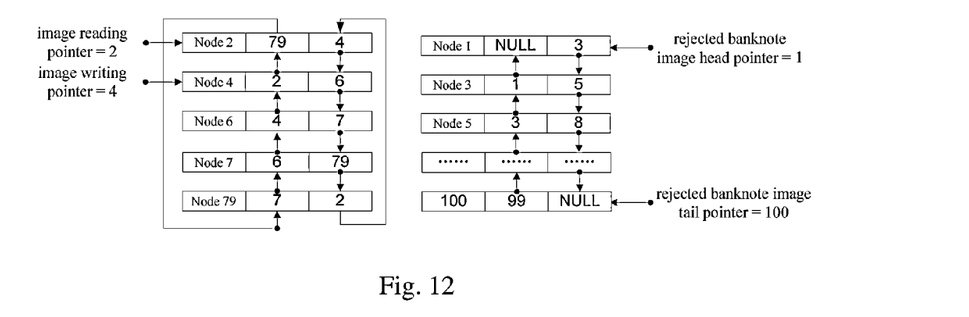
FIG. 12 is a schematic diagram of organization form of a storage region index linked list when the number of images failing to be identified by the image identification system according to the invention reaches a maximum value.
Figure 13:
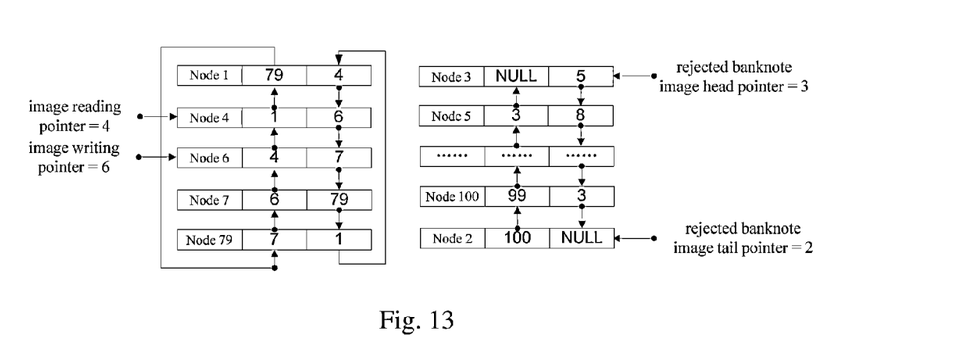
FIG. 13 is a schematic diagram of transferring a node of an earliest rejected banknote image stored in a rejected banknote image linked list to an image storage linked list, and transferring a node of a newest rejected banknote image stored in the image storage linked list to the tail of the rejected banknote image linked list, when the number of images failing to be identified by the image identification system according to the invention reaches a maximum value.

In an actual image identification system, the system is used for a long time, and thus there are more and more rejected banknote images. When the number of the rejected banknote images is close to the number of image storage regions, for example, when the number of rejected banknote images is closer and closer to 100 in the exemplary embodiment, for the further use of the identification system, some image storage regions occupied by the rejected banknote images need to be cleared to store new acquired images. In addition, a certain storage region is required to coordinate with the calculation in the image identification process of the identification module, and thus a certain storage region is needed to be reserved for the identification calculation of the image. In the embodiment, the number of reserved storage regions is generally set as 5, when the number of the rejected banknote images reaches 95, and assuming that the image regions 2, 4, 6, 7, 79 are not occupied by the rejected banknote images, the contents of image storage regions are shown in FIG. 11, and an organization form of the storage region index linked list is shown in FIG. 12. When an image failing to be identified appears again in the process of the operation, and assuming the image appears in the second node, the node 2 in the image storage index linked list is additionally added to the tail of the rejected banknote image linked list, and a node to which the rejected banknote image head pointer in the rejected banknote image linked list points returns back to the image storage index linked list. In this case, an organization form of the storage region linked list is shown in FIG. 13.

In the above embodiment, a preferred embodiment of the invention is provided, where the number of image storage regions is set as 100 generally. Those skilled in the art may understand according to common knowledge in the data storage filed, that: the number of image storage regions may be set as arbitrarily changeable based on the sizes of the storage spaces of memories and the data volumes of the acquired images. Such change is a well-known knowledge. Thus, it may be considered that the technical solution according to the invention may be achieved by setting the number of image storage regions as N, where N is a natural number greater than 1. To clearly express the movements of the rejected banknote image head pointer and the rejected banknote image tail pointer and the modification rules of storage locations of a previous image and a next images stored in the corresponding nodes, it is assuming a node in which rejected banknote image appears in the exemplary embodiment. It should be understood by those skilled in the art that such appearance is random, and the example cited in the exemplary embodiment is just an assumption result. In practice, a node in which rejected banknote image appears is not limited to the content described in the exemplary embodiment.

It should be noted that, the above-mentioned preferred exemplary embodiment should not be interpreted as limiting the invention. The protection scope of the invention should be subject to the defined scope of accompanying claims. Several alternations and modifications also can be made by those skilled in the art without deviation from the spirit and scope of the invention, these alternations and modifications also should be interpreted as the protection scope of the invention.

The invention claimed is:

1. An image identification system comprising:
    an image sensor adapted to acquire an image of an identification object;
    an image memory adapted to divide an image storage space into N storage regions according to a maximum data volume of acquired images, wherein N is a natural number greater than 1, and each of the storage regions is configured to store one acquired image;
    a processor coupled to a memory, the image memory and the image sensor, wherein executable instruction codes are stored in the memory, the instruction codes when executed by the processor, configures the system to:
    identify an image stored in the image memory;
    control the storage region for an acquired image and the storage region for an image failing to be identified; and
    control and coordinate data calculation and transmission between the image sensor, the image memory, the processor and the memory;
    wherein a storage region index linked list is provided, wherein the storage region index linked list is divided into N nodes, N is a natural number greater than 1; the nodes are in a one-to-one correspondence with the storage regions, each node is adapted to store storage locations of a previous image and a next image linked to the node; the storage region index linked list is provided with three node pointers: an acquired image writing pointer for pointing to a writing node corresponding to a storage region for writing the acquired image; an identification image reading pointer for pointing to a reading node corresponding to a storage region for an image to be identified; a rejected banknote image tail pointer for pointing to a rejected banknote node corresponding to a storage region for a latest rejected banknote image, wherein the rejected banknote is one of the acquired images; and when there is no rejected banknote image, the rejected banknote image tail pointer points to an invalidity location,
    wherein the storage region index linked list is divided into two linked lists: an image storage linked list and a rejected banknote image linked list; the image storage linked list comprises a node in the storage region index linked list corresponding to a storage region in which the acquired image is to be written into, and the rejected banknote image linked list comprises a node in the storage region index linked list corresponding to a storage region occupied by a rejected banknote image,
    for a reading node to which an identification image reading pointer points, which corresponds to an image in an image storage region that is identified successfully, the identification image reading pointer is directed to a node corresponding to a storage location of a next image which is recorded in the reading node; for a reading node to which an identification image reading pointer points, which corresponds to an image in an image storage region that is identified unsuccessfully, the rejected banknote image tail pointer is directed to the reading node; a storage location of a next image which is stored in a node corresponding to a storage location of a previous image stored in the reading node is a storage location of a next image which is stored in the reading node, and a storage location of a previous image which is stored in a node corresponding to a storage location of a next image stored in the reading node is a storage location of a previous image which is stored in the reading node.

2. The image identification system according to claim 1, wherein the storage region index linked list comprises N nodes, and each node comprises at least two units, wherein the first unit is adapted to store an address of an image storage region for storing the previous image linked to the node; and the second unit is adapted to store an address of an image storage region for storing the next image linked to the node.

3. The image identification system according to claim 1, wherein a rejected banknote image head pointer for pointing to a node corresponding to a storage region for a first rejected banknote image is provided.

4. The image identification system according to claim 3, wherein in the case that the number of the rejected banknote images reaches a maximum permissible value, if a new rejected banknote image is generated, a node to which the identification image reading pointer points is added to a tail of the rejected banknote linked list; a node to which the rejected banknote image head pointer points is returned back to the image storage linked list, so as to add the new rejected banknote image to an identification linked list; the identification image reading pointer is directed to a next node, the rejected banknote image head pointer is directed to a node corresponding to a storage region of a next rejected banknote image, and the storage locations of a previous image and a next image linked to each of the next node and the node corresponding to a storage region of a next rejected banknote image and stored into the node are modified.

5. An image storage control method of an image identification system, wherein the image identification system comprising:
an image sensor adapted to acquire an image of an identification object;
an image memory adapted to divide an image storage space into N storage regions according to a maximum data volume of acquired images, wherein N is a natural number greater than 1, and each of the storage regions is configured to store one acquired image;
a processor coupled to a memory, the image memory and the image sensor, wherein executable instruction codes are stored in the memory, the instruction codes when executed by the processor, configures the system to:
identify an image stored in the image memory;
control the storage region for an acquired image and the storage region for an image failing to be identified; and
control and coordinate data calculation and transmission between the image sensor, the image memory, the processor and the memory;
wherein a storage region index linked list is provided, wherein the storage region index linked list is divided into N nodes, wherein N is a natural number greater than 1; the nodes are in a one-to-one correspondence with the storage regions, each node is adapted to store storage locations of a previous image and a next image linked to the node; the storage region index linked list is provided with three node pointers: an acquired image writing pointer for pointing to a writing node corresponding to a storage region for writing the acquired image; an identification image reading pointer for pointing to a reading node corresponding to a storage region for an image to be identified; a rejected banknote image tail pointer for pointing to a rejected banknote node corresponding to a storage region for a latest rejected banknote image, wherein the rejected banknote is one of the acquired images; and when there is no rejected banknote image, the rejected banknote image tail pointer points to an invalidity location,
the method comprising:
step 1, acquiring an image of an identification object by an image sensor;
step 2, writing the acquired image into a corresponding image storage region according to a writing node to which an acquired image writing pointer points;
step 3, directing the acquired image writing pointer to a node corresponding to a storage location of a next image that is stored in the writing node; performing step 1 or step 4 under the control of the image identification system;
step 4, identifying an image in an image storage region corresponding to a reading node to which an identification image reading pointer points, and if the image is identified, performing step 5; otherwise, performing step 6;
step 5, determining whether the image in an image storage region corresponding to a reading node to which an identification image reading pointer points is a last acquired image; and directing the identification image reading pointer to a node corresponding to a storage location of a next image which is recorded in the reading node, and returning to step 4 if the image in the image storage region corresponding to the reading node to which an identification image reading pointer points is not the last acquired image;
step 6, moving a rejected banknote image tail pointer and modifying addresses of locations for storing relevant nodes, wherein the rejected banknote image tail pointer is directed to the reading node; a storage location of a next image which is stored in a node corresponding to a storage location of a previous image stored in the reading node is modified to be a storage location of a next image which is stored in the reading node, and a storage location of a previous image which is stored in a node corresponding to a storage location of a next image stored in the reading node is modified to be a storage location of a previous image which is stored in the reading node;
step 7, modifying a storage location of a previous image of a node to which the rejected banknote image tail pointer points to be a node corresponding to a storage region for storing a previous rejected banknote image; and
step 8, determining whether the image in an image storage region corresponding to a node to which the rejected banknote image tail pointer points is not the last acquired image; and directing the identification image reading pointer to a node corresponding to a storage location of a next image recorded in the reading node, and returning to the step 4 if the image in the image storage region corresponding to the reading node to which an identification image reading pointer points is not the last acquired image.

6. The image storage control method of the image identification system according to claim 5, further comprising: step 0, initializing a storage region index linked list to implement a one-to-one correspondence between the nodes and the storage regions, when the image identification system is initialized; writing into a current node an address of an image storage region corresponding to a previous node adjacent to the current node and an address of an image storage region corresponding to a next node adjacent to the current node, directing both the acquired image writing pointer and the identification image reading pointer to the first node, and directing the rejected banknote image tail pointer to an invalidity location.

7. The image storage control method of the image identification system according to claim 5, wherein the storage region index linked list comprises N nodes, and each node comprises at least two units, wherein the first unit is adapted to store an address of an image storage region for storing the previous image linked to the node; and the second unit is adapted to store an address of an image storage region for storing the next image linked to the node.

8. The image storage control method of the image identification system according to claim 7, wherein the storage region index linked list is divided into two linked lists: an image storage linked list and a rejected banknote image linked list; the image storage linked list comprises a node in the storage region index linked list corresponding to a storage region in which the acquired image is to be written into, and the rejected banknote image linked list comprises a node in the storage region index linked list corresponding to a storage region occupied by a rejected banknote image.

9. The image storage control method of the image identification system according to claim 8, further comprising: step 0, initializing a storage region index linked list to implement a one-to-one correspondence between the nodes and the storage regions, when the image identification system is initialized; writing into a current node an address of an image storage region corresponding to a previous node adjacent to the current node and an address of an image storage region corresponding to a next node adjacent to the current node, directing both the acquired image writing pointer and the identification image reading pointer to the first node, and directing the rejected banknote image tail pointer to an invalidity location.

10. The image storage control method of the image identification system according to claim 7, further comprising: step 0, initializing a storage region index linked list to implement a one-to-one correspondence between the nodes and the storage regions, when the image identification system is initialized; writing into a current node an address of an image storage region corresponding to a previous node adjacent to the current node and an address of an image storage region corresponding to a next node adjacent to the current node, directing both the acquired image writing pointer and the identification image reading pointer to the first node, and directing the rejected banknote image tail pointer to an invalidity location.

11. The image storage control method of the image identification system according to claim 5, wherein a rejected banknote image head pointer for pointing to a node corresponding to a storage region for a first rejected banknote image is provided.

12. The image storage control method of the image identification system according to claim 11, wherein in the case that the number of the rejected banknote images reaches a maximum permissible value, if a new rejected banknote image is generated, a node to which the identification image reading pointer points is added to a tail of the rejected banknote linked list; a node to which the rejected banknote image head pointer points is returned back to the image storage linked list, so as to add the new rejected banknote image to an identification linked list; the identification image reading pointer is directed to a next node, the rejected banknote image head pointer is directed to a node corresponding to a storage region of a next rejected banknote image, and the storage locations of a previous image and a next image linked to each of the next node and the node corresponding to a storage region of a next rejected banknote image and stored into the node are modified.

13. The image storage control method of the image identification system according to claim 12, further comprising: step 0, initializing a storage region index linked list to implement a one-to-one correspondence between the nodes and the storage regions, when the image identification system is initialized; writing into a current node an address of an image storage region corresponding to a previous node adjacent to the current node and an address of an image storage region corresponding to a next node adjacent to the current node, directing both the acquired image writing pointer and the identification image reading pointer to the first node, and directing the rejected banknote image tail pointer to an invalidity location.

14. The image storage control method of the image identification system according to claim 11, further comprising: step 0, initializing a storage region index linked list to implement a one-to-one correspondence between the nodes and the storage regions, when the image identification system is initialized; writing into a current node an address of an image storage region corresponding to a previous node adjacent to the current node and an address of an image storage region corresponding to a next node adjacent to the current node, directing both the acquired image writing pointer and the identification image reading pointer to the first node, and directing the rejected banknote image tail pointer to an invalidity location.

* * * * *